United States Patent
Kim et al.

(10) Patent No.: US 11,064,523 B2
(45) Date of Patent: *Jul. 13, 2021

(54) METHOD AND APPARATUS FOR TRANSMITTING DATA IN WIRELESS COMMUNICATION SYSTEM

(71) Applicant: LG ELECTRONICS INC., Seoul (KR)

(72) Inventors: Jinmin Kim, Seoul (KR); Kiseon Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,874

(22) Filed: Jan. 9, 2020

(65) Prior Publication Data

US 2020/0154476 A1    May 14, 2020

Related U.S. Application Data

(63) Continuation of application No. 15/747,751, filed as application No. PCT/KR2016/008211 on Jul. 27, 2016, now Pat. No. 10,560,962.

(Continued)

(51) Int. Cl.
*H04W 74/08* (2009.01)
*H04W 74/06* (2009.01)
(Continued)

(52) U.S. Cl.
CPC ....... *H04W 74/0808* (2013.01); *H04W 48/16* (2013.01); *H04W 74/06* (2013.01); *H04W 84/12* (2013.01)

(58) Field of Classification Search
CPC combination set(s) only.
See application file for complete search history.

(56) References Cited

U.S. PATENT DOCUMENTS

| | | | |
|---|---|---|---|
| 8,553,628 B2 | 10/2013 | Jin et al. | |
| 10,045,340 B1 * | 8/2018 | Chu | H04W 24/10 |

(Continued)

FOREIGN PATENT DOCUMENTS

KR    1020150017288    2/2015

OTHER PUBLICATIONS

PCT International Application No. PCT/KR2016/008211, Written Opinion of the International Searching Authority dated Oct. 24, 2016, 9 pages.

(Continued)

*Primary Examiner* — Yee F Lam
(74) *Attorney, Agent, or Firm* — Lee Hong Degerman Kang Waimey

(57) ABSTRACT

In an embodiment of the present invention, a method for indicating, by an access point (AP) associated with a first basic service set (BSS), spatial reuse (SR) in a wireless LAN (WLAN) system includes transmitting a trigger frame which requests uplink multi-user (UL MU) transmission of a plurality of stations (STAs) and receiving an UL MU physical protocol data unit (PPDU) generated based on the trigger frame from the plurality of STAs. The trigger frame may include SR indication information for indicating the SR of an overlapping BSS (OBSS) STA. The first high efficiency (HE)-signal (SIG) A field of the UL MU PPDU may include SR support information generated based on the SR indication information.

14 Claims, 9 Drawing Sheets

Related U.S. Application Data

(60) Provisional application No. 62/198,618, filed on Jul. 29, 2015.

(51) Int. Cl.
*H04W 48/16* (2009.01)
*H04W 84/12* (2009.01)

(56) References Cited

U.S. PATENT DOCUMENTS

| | | | |
|---|---|---|---|
| 10,172,137 B1* | 1/2019 | Hedayat | H04W 72/0473 |
| 10,863,502 B1* | 12/2020 | Chu | H04W 72/0446 |
| 2014/0119288 A1 | 5/2014 | Zhu et al. | |
| 2015/0016558 A1 | 1/2015 | Choi et al. | |
| 2015/0282043 A1 | 10/2015 | Fang et al. | |
| 2016/0044533 A1 | 2/2016 | Seok | |
| 2016/0050634 A1 | 2/2016 | Seok | |
| 2016/0100396 A1 | 4/2016 | Seok | |
| 2016/0105836 A1 | 4/2016 | Seok | |
| 2016/0113009 A1 | 4/2016 | Seok | |
| 2016/0128057 A1 | 5/2016 | Seok | |
| 2016/0143026 A1 | 5/2016 | Seok | |
| 2016/0150514 A1 | 5/2016 | Kwon et al. | |
| 2016/0165482 A1 | 6/2016 | Yang et al. | |
| 2016/0174200 A1 | 6/2016 | Seok | |
| 2016/0242177 A1 | 8/2016 | Seok | |
| 2016/0249381 A1 | 8/2016 | Choi | |
| 2016/0249397 A1* | 8/2016 | Seok | H04W 74/0808 |
| 2016/0255625 A1 | 9/2016 | Kim et al. | |
| 2016/0360443 A1* | 12/2016 | Hedayat | H04B 7/0452 |
| 2017/0338919 A1* | 11/2017 | Lim | H04L 5/0092 |
| 2018/0220456 A1 | 8/2018 | Kim et al. | |
| 2019/0110297 A1* | 4/2019 | Hedayat | H04W 72/0473 |
| 2019/0116014 A1 | 4/2019 | Gan | |

OTHER PUBLICATIONS

European Patent Office Application Serial No. 16181697.0, Search Report dated Dec. 7, 2016, 7 pages.
Lakshmanan, S. et al., "Spatial Reuse with Smart Antennas in Indoor WLANs," Jul. 2009, 14 pages.
Stacey, R., "Specification Framework for TGax," Wireless LANs, doc.: IEEE 802.11-15/0132r15, XP068106633, Jan. 2016, 62 pages.
Ryu, K. et al., "UL MU Procedure," doc.: IEEE 802.11-15/0365r0, XP068083020, Mar. 2015, 16 pages.
U.S. Appl. No. 15/747,751, Office Action dated Jan. 23, 2019, 15 pages.
U.S. Appl. No. 15/747,751, Notice of Allowance dated Sep. 25, 2019, 10 pages.

\* cited by examiner

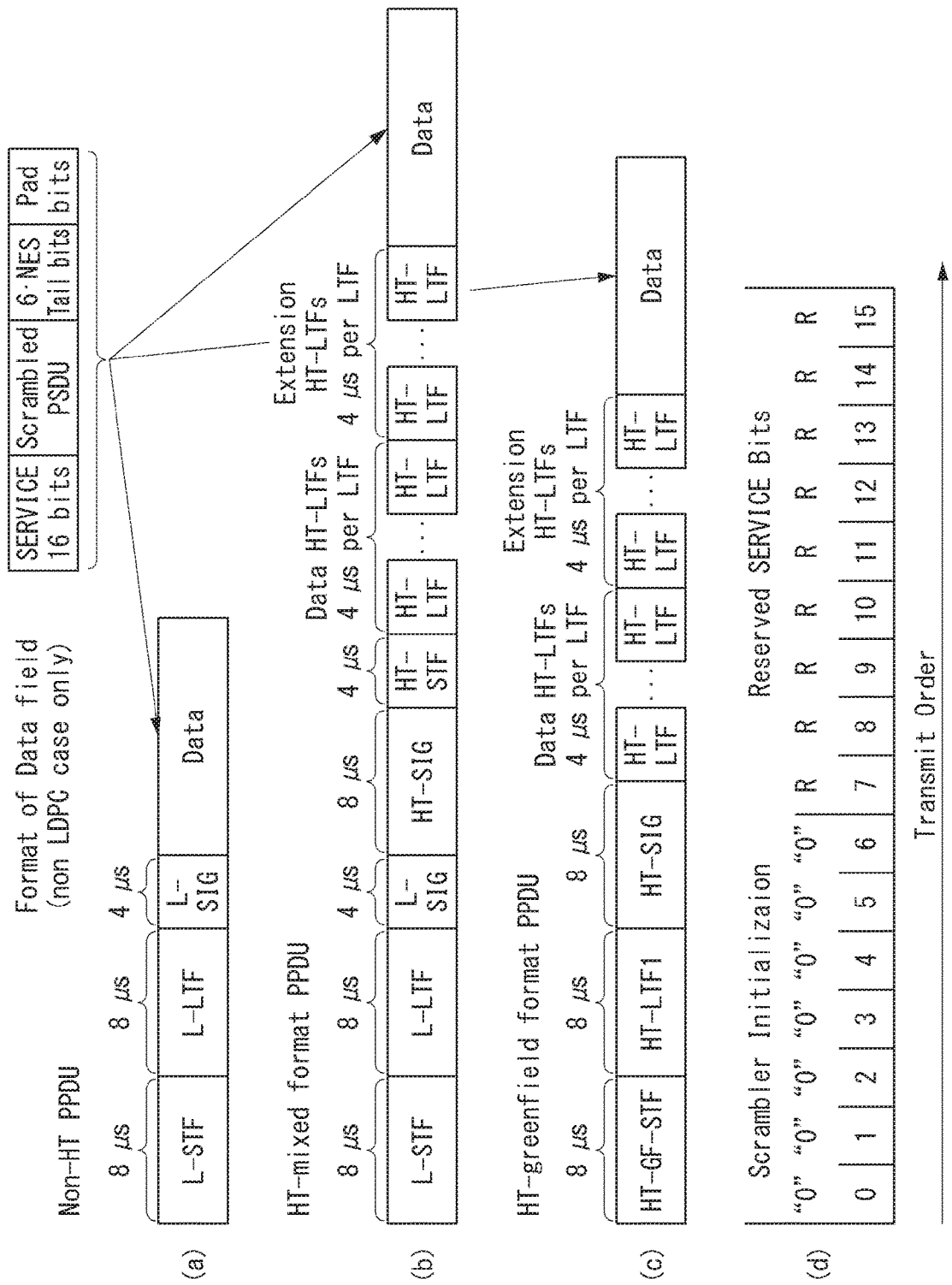

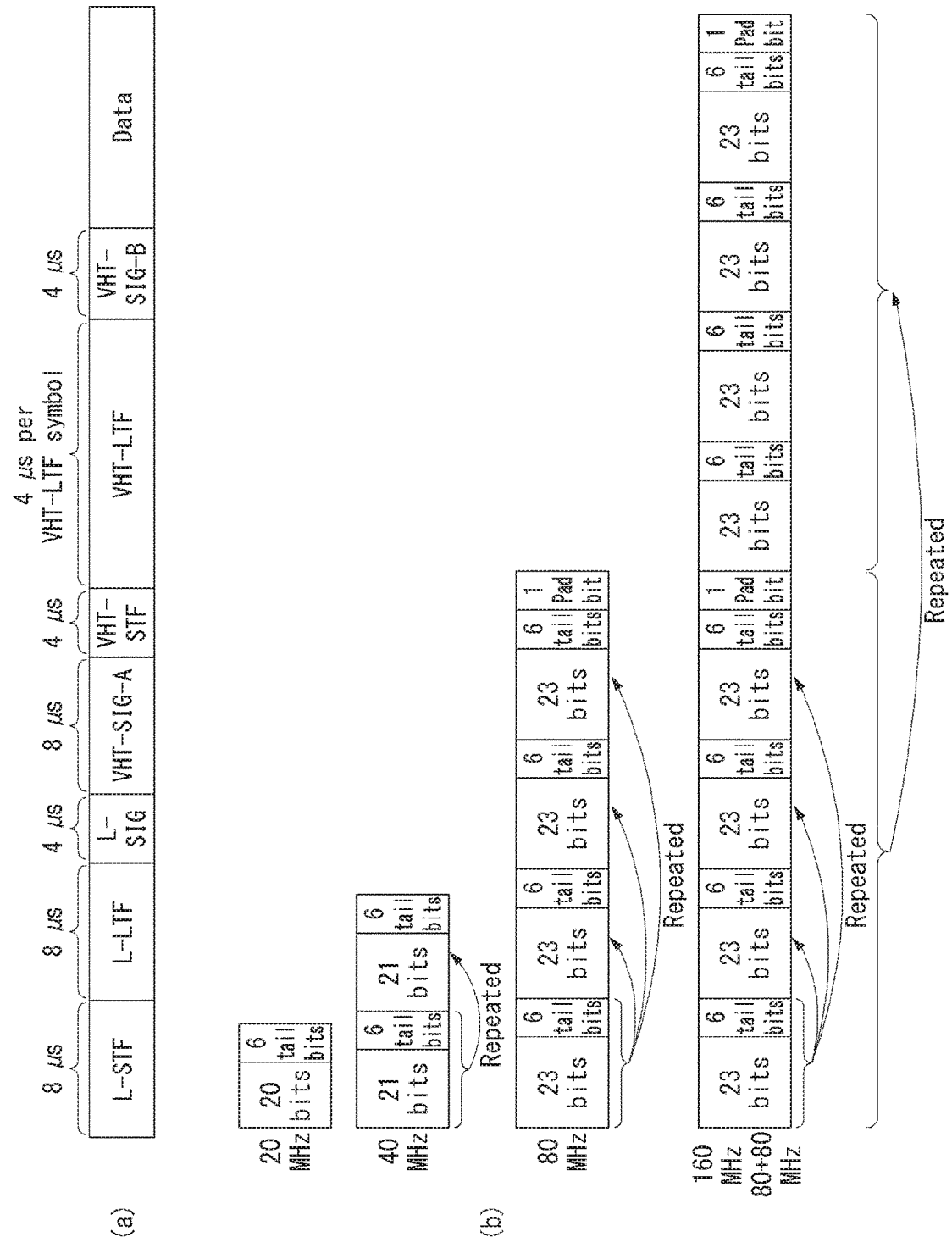

FIG. 5

| L-STF | L-LTF | L-SIG | HE-SIG A | | | | |
|-------|-------|-------|----------|---------|-------|-------|------|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |

FIG. 6

| L-STF | L-LTF | L-SIG | HE-SIG A | | HE-STF | HE-LTF | Data for STA1 |
|-------|-------|-------|----------|---------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

FIG. 7

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

FIG. 11

| Frame Control | Duration | (RA) | TA | Common Info | Per User Info | ... | Per User Info | Padding | FCS |

METHOD AND APPARATUS FOR TRANSMITTING DATA IN WIRELESS COMMUNICATION SYSTEM

CROSS-REFERENCE TO RELATED APPLICATIONS

This application is a continuation of U.S. patent application Ser. No. 15/747,751, filed on Jan. 25, 2018, now U.S. Pat. No. 10,560,962, which is the National Stage filing under 35 U.S.C. 371 of International Application No. PCT/KR2016/008211, filed on Jul. 27, 2016, which claims the benefit of U.S. Provisional Application No. 62/198,618, filed on Jul. 29, 2015, the contents of which are all hereby incorporated by reference herein in their entirety.

TECHNICAL FIELD

The present invention relates to a wireless communication system and, more particularly, to a method for transmitting spatial reuse support information in order to support the spatial reuse of an OBSS AP/STA and an STA apparatus for performing the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

In the case of an existing system, CCA is performed based on a CCA level that is identically set in each BSS. That is, conventionally, a CCA level fixed for each BSS is applied. Accordingly, there is a problem in that efficiency of spatial bandwidth reuse between BSSs is very low. The reason for this is that STAs belonging to another BSS are all determined to be a channel busy state because a fixed CCA level is applied to the STAs even though the STAs are able to send signals depending on a communication environment, channel quality, etc. and thus the STAs are unable to send signals.

Accordingly, in the next-generation systems, a technology for performing spatial reuse to which a dynamic CCA level capable of improving spatial reuse efficiency of a bandwidth is applied may be introduced. In this specification, there are proposed a method for supporting an OBSS AP/STA so that it performs spatial reuse and an STA apparatus for performing the same.

Objects to be achieved by the present invention are not limited to the aforementioned objects, and those skilled in the art to which the present invention pertain may evidently understand various other objects from the following description.

Technical Solution

In an embodiment of the present invention, a method for indicating, by an access point (AP) associated with a first basic service set (BSS), spatial reuse (SR) in a wireless LAN (WLAN) system includes sending a trigger frame which requests uplink multi-user (UL MU) transmission of a plurality of stations (STAs) and receiving an UL MU physical protocol data unit (PPDU) generated based on the trigger frame from the plurality of STAs. The trigger frame may include SR indication information for indicating the SR of an overlapping BSS (OBSS) STA. The first high efficiency (HE)-signal (SIG) A field of the UL MU PPDU may include SR support information generated based on the SR indication information.

Furthermore, the SR indication information may include control information identically transmitted to the plurality of STAs so that the plurality of STAs generates the same SR support information.

Furthermore, the trigger frame may include a Common Info field including common control information about a plurality of STAs receiving the trigger frame and a Per User Info field including STA-specific control information about each of the plurality of STAs. The SR indication information may be included in the Common Info field of the trigger frame.

The method may further include receiving the second HE-SIG A field of a PPDU transmitted by an STA placed in a second BSS if the AP is placed in an OBSS in which the first BSS and the second BSS overlap, obtaining SR support information of the second HE-SIG A field, and performing the SR based on the SR support information.

Furthermore, performing the SR may include adjusting a clear channel assessment (CCA) level and determining the busy or idle state of a channel based on the adjusted CCA level.

Furthermore, the SR support information may include at least one of SR permission information of the OBSS STA, transmission power information of the AP, and information about an interference level acceptable to the AP.

Furthermore, in another embodiment of the present invention, a method for indicating, by a station (STA) associated with a first basic service set (BSS), spatial reuse (SR) in a wireless LAN (WLAN) system includes receiving a trigger frame which requests the uplink multi-user (UL MU) transmission of a plurality of stations (STAs) and generating an UL MU physical protocol data unit (PPDU) generated based on the trigger frame from the plurality of STAs. The trigger frame may include SR indication information for indicating the SR of an overlapping BSS (OBSS) STA. The first high efficiency (HE)-signal (SIG) A field of the UL MU PPDU may include SR support information generated based on the SR indication information.

Furthermore, the SR indication information may include control information identically transmitted to the plurality of STAs so that the plurality of STAs generates the same SR support information.

Furthermore, the trigger frame may include a Common Info field including common control information about a plurality of STAs receiving the trigger frame and a Per User Info field including STA-specific control information about each of the plurality of STAs. The SR support information may be included in the Common Info field of the trigger frame.

The method may further include receiving the second HE-SIG A field of a PPDU transmitted by an STA placed in a second BSS if the STA is placed in an OBSS in which the first BSS and the second BSS overlap, obtaining SR support information of the second HE-SIG A field, and performing the SR based on the SR support information.

Furthermore, performing the SR may include adjusting a clear channel assessment (CCA) level and determining the busy or idle state of a channel based on the adjusted CCA level.

Furthermore, the SR support information may include at least one of SR permission information of the OBSS STA, transmission power information of the AP, and information about an interference level acceptable to the AP.

Furthermore, in another embodiment of the present invention, a station (STA) associated with a first basic service set (BSS) in a wireless LAN (WLAN) system includes a radio frequency (RF) unit configured to transmit and receive radio signals and a processor configured to control the RF unit. The STA may receive a trigger frame which requests the uplink multi-user (UL MU) transmission of a plurality of stations (STAs) and generates an UL MU physical protocol data unit (PPDU) generated based on the trigger frame from the plurality of STAs. The trigger frame may include SR indication information for indicating the SR of an overlapping BSS (OBSS) STA. The first high efficiency (HE)-signal (SIG) A field of the UL MU PPDU may include SR support information generated based on the SR indication information.

Furthermore, the SR indication information may include control information identically transmitted to the plurality of STAs so that the plurality of STAs generates the same SR support information.

Furthermore, if the STA is placed in an OBSS in which the first BSS and a second BSS overlap, the STA may receive the second HE-SIG A field of a PPDU transmitted by an STA placed in the second BSS, may obtain SR support information of the second HE-SIG A field, and may perform the SR based on the SR support information.

Advantageous Effects

In accordance with an embodiment of the present invention, spatial bandwidth reuse efficiency between STAs belonging to an OBSS can be improved. The adjustment of a CCA level is not fixed, but is dynamically performed. Accordingly, a loss of communication performance can be minimized because a change in the state of STAs and a change in the environment of a channel between STAs are handled actively and rapidly.

Furthermore, in accordance with an embodiment of the present invention, spatial efficiency can be improved by performing dynamic CCA. Furthermore, a reduction of system throughput performance can be minimized due to an increase of spatial efficiency because the quality and margin of a device which may be a victim in an interference environment are taken into consideration.

Furthermore, in accordance with an embodiment of the present invention, spatial reuse transmission can be applied to a longer time interval because an OBSS STA performs dynamic CCA. Accordingly, frequency use efficiency can be further improved.

Furthermore, in accordance with an embodiment of the present invention, SR support information is generated based on SR indication information directly generated by an AP, that is, a victim STA, by taking into consideration its own capabilities, a surrounding interference situation, and a channel situation. Accordingly, there is an advantage in that SR support information having the highest reliability is transmitted assuming that the same SR support information is transmitted to all of OBSS AP/STAs. Furthermore, if SR support information is generated identically with SR indication information, an STA can generate the SR support information by duplicating the SR indication information received through a trigger frame without any change. Accordingly, there is an advantage in that a procedure for generating SR support information can become very simple.

Furthermore, in accordance with an embodiment of the present invention, SR indication information is signaled and transmitted in a trigger frame (MAC payload) that is transmitted in a broadcast manner. Accordingly, there is an advantage in that transmission overhead of SR indication information is reduced because a plurality of STAs can receive the same SR indication information at the same time.

Other advantages of the present invention are additionally described in the following embodiments.

DESCRIPTION OF DRAWINGS

The accompany drawings, which are included to provide a further understanding of this document and are incorporated on and constitute a part of this specification illustrate embodiments of this document and together with the description serve to explain the principles of this document.

FIG. 3 illustrating a non-HT format PPDU and an HT format PPDU in a wireless communication system to which an embodiment of the present invention may be applied.

FIG. 4 illustrates a VHT format PPDU in a wireless communication system to which an embodiment of the present invention may be applied.

FIG. 5 is a diagram illustrating an HE format PPDU according to an embodiment of the present invention.

FIG. 6 is a diagram illustrating an HE format PPDU according to an embodiment of the present invention.

FIG. 7 is a diagram illustrating an HE format PPDU according to an embodiment of the present invention.

FIG. 11 is a diagram showing the structure of a trigger frame according to an embodiment of the present invention.

MODE FOR INVENTION

Terms used in this specification are common terms now widely used by taking into consideration functions in this specification, but the terms may be changed depending on intentions of those skilled in the art, a use practice, or the appearance of a new technology. Furthermore, in a specific case, some terms are randomly selected by the applicant. In this case, the detailed meaning of a corresponding term will be described in the corresponding part of the description of this specification. Accordingly, the terms used in this specification should not be interpreted simply based on their names, but should be interpreted based on their substantial meanings and contents over this specification.

Furthermore, embodiments are described in detail with reference to the accompanying drawings and contents described in the accompanying drawings, but the present invention is not limited to the embodiments.

Hereinafter, some embodiments of the present invention are described in detail with reference to the accompanying drawings.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

Figure 1:
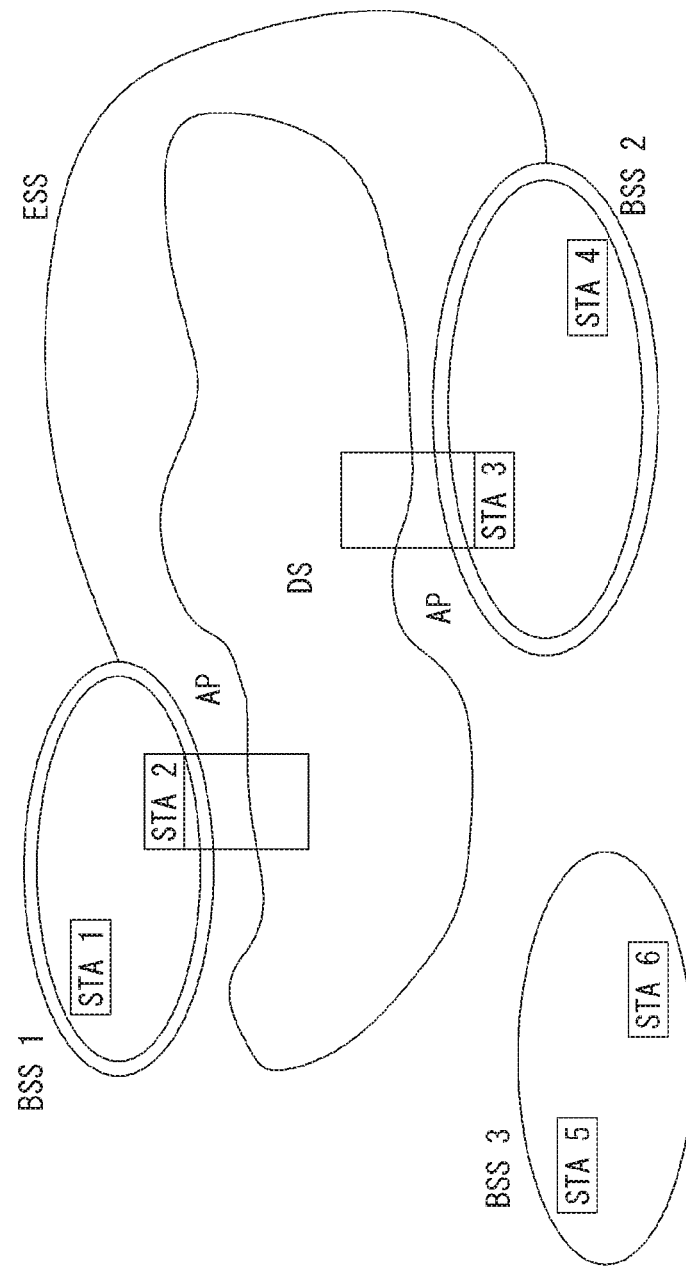
FIG. 1 is a diagram showing an example of an IEEE 802.11 system to which an embodiment of the present invention may be applied.

FIG. 1 is a diagram showing an example of an IEEE 802.11 system to which an embodiment of the present invention may be applied. In certain embodiments, the present invention is implemented in an IEEE 802.11 ax network environment.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

Figure 2:
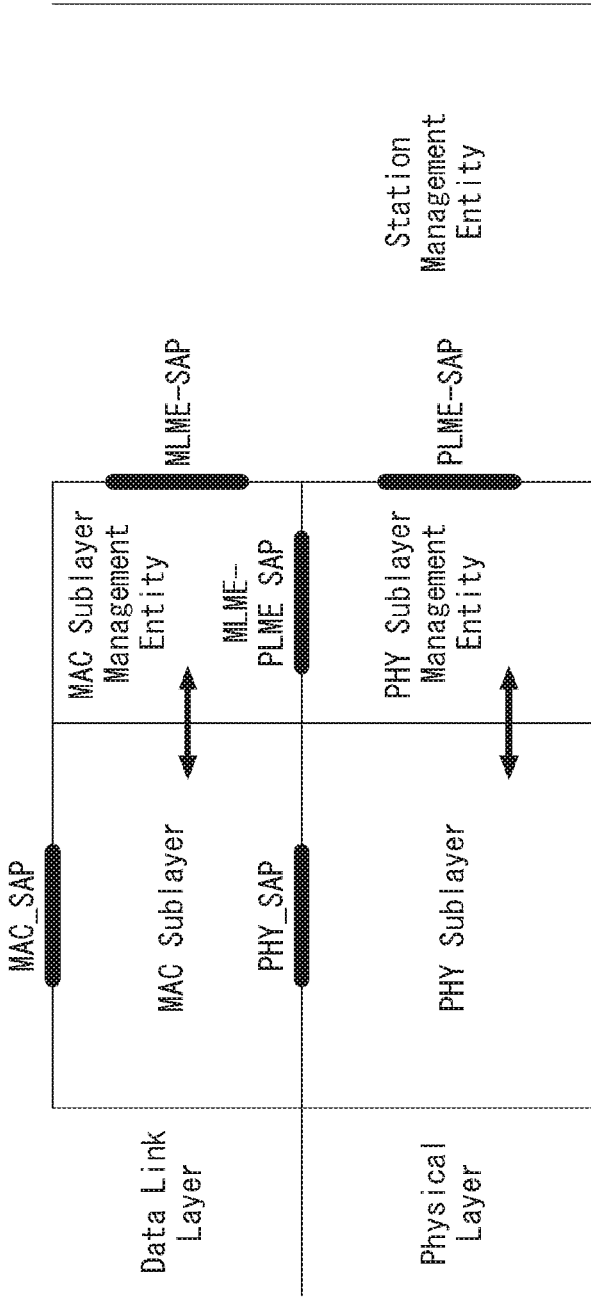
FIG. 2 is a diagram illustrating the configuration of layer architecture of an IEEE 802.11 system to which an embodiment of the present invention may be applied.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate (Rate) field of 4 bits, a reserved bit of 1 bit, a length (Length) field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, and L-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below is a table showing the HT-SIG field.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

TABLE 1

| FIELD | BIT | DESCRIPTION |
| --- | --- | --- |
| MCS | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 is a table showing the VHT-SIG-A1 field.

TABLE 2

| FIELD | BIT | DESCRIPTION |
|---|---|---|
| BW | 2 | Set to "0" IfaBW is 20 MHz<br>Set to "1" IfaBW is 40 MHz<br>Set to "2" ifaBW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VEIT MU PPDU if not |
| NSTS/Partial AID | 12 | In the case of a VEIT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |
| TXOP_PS_NOT ALLOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 is a table showing the VHT-SIG-A2 field.

TABLE 3

| FIELD | BIT | DESCRIPTION |
| --- | --- | --- |
| Short GI | 1 | Set to "0" if a short GI is not used in a data field<br>Set to "1" if a short GI is used in a data field |
| Short GI disambiguation | 1 | Set to "1" if a short GI is used and an extra symbol is required for the pay load of a PPDU<br>Set to "0" if an extra symbol is not required |
| SU/MU coding | 1 | hi the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of UDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder<br>Set to "0" |

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length (Length) field indicates the length (prior to the padding of an end-of-frame (EOF)) of an A-MPDU. The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, the bits of the VHT-SIG-B field are repeated twice. In 80 MHz transmission, the bits of the VHT-SIG-B field are repeated four times, and pad bits set to 0 are attached to the VHT-SIG-B field.

In 160 MHz transmission and 80+80 MHz transmission, first, the bits of the VHT-SIG-B field are repeated four times and pad bits set to 0 are attached to the VHT-SIG-B field as in 80 MHz transmission. Furthermore, all of the 117 bits are repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail with reference to FIG. 5.

UL MU Transmission Method

Many vendors of various fields have a lot of interest in the next-generation Wi-Fi, and there is a growing demand for the improvement of high throughput and quality of experience (QoE) performance after 802.11ac. Accordingly, a new frame format and numerology for an 802.11ax system, that is, the next-generation WLAN system, are actively discussed.

IEEE 802.11ax is one of recently proposed WLAN systems as the next-generation WLAN system for supporting a higher data rate and processing a higher user load, and is also called a so-called high efficiency WLAN (HEW).

The IEEE 802.11ax WLAN system may operate in a 2.4 GHz frequency band and a 5 GHz frequency band like the existing WLAN system. Furthermore, the IEEE 802.11ax WLAN system may also operate in a higher 60 GHz frequency band.

In the IEEE 802.11ax system, an FFT size that is four times greater in each bandwidth than that of the existing IEEE 802.11 OFDM systems (e.g., IEEE 802.11a, 802.11n, and 802.11ac) may be used for average throughput enhancement and outdoor robust transmission for inter-symbol interference in outdoor environments. This is described below with reference to related drawings.

In the following description of an HE format PPDU, the aforementioned descriptions of the non-HT format PPDU, the HT-mixed format PPDU, the HT-green field format PPDU and/or the VHT format PPDU may be merged with the description of the HE format PPDU unless described otherwise. Furthermore, the HE format PPDU may include a physical (PHY) preamble and a data field. The PHY preamble may include an HE-SIG A field, an HE-SIG B field, an HE-STF and/or an HE-LTF in addition to the aforementioned L-STF, L-LTF, and L-SIG field. The HE format fields are described in detail later with reference to related drawings.

FIG. 5 is a diagram illustrating an HE format PPDU according to an embodiment of the present invention.

FIG. 5 shows an example of an PPDU format in which 80 MHz is allocated to a single STA (or if an OFDMA resource unit is allocated to a plurality of STAs within 80 MHz) or different streams of 80 MHz are respectively allocated to a plurality of STAs.

Referring to FIG. 5, an L-STF, an L-LTF, and an L-SIG field may be transmitted in an OFDM symbol generated based on 64 FFT points (or 64 subcarriers) in each 20 MHz channel.

Furthermore, an HE-SIG B field may be placed subsequent to an HE-SIG A field. In this case, an FFT size per unit frequency may be further increased after an HE-STF (or the HE-SIG B field). For example, from the HE-STF (or the HE-SIG B field), 256 FFT may be used in a 20 MHz channel, 512 FFT may be used in a 40 MHz channel, and 1024 FFT may be used in an 80 MHz channel.

The HE-SIG A field may include common control information (i.e., a common field) in common transmitted to STAs that receive a PPDU. The HE-SIG A field may be transmitted in one or three OFDM symbols. The HE-SIG A field is duplicated in a 20 MHz unit and includes the same information. Furthermore, the HE-SIG A field provides notification of the entire bandwidth information of a system.

Table 4 is a table showing information included in the HE-SIG A field.

TABLE 4

| FIELD | BIT | DESCRIPTION |
| --- | --- | --- |
| Bandwidth | 2 | Indicate a bandwidth in which a PPDU is transmitted, for example, 20 MHz, 40 MHz, 80 MHz, or 160 MHz |
| Group ID | 6 | Indicate an STA or a group of STAs which will receive a PPDU |
| Stream information | 12 | Indicate the location or number of a spatial stream for each STA or indicate the location or number of a spatial stream for a group of STAs |
| UL indication | 1 | Indicate whether a PPDU is directed to an AP (i.e., uplink) or is directed to an STA (i.e., downlink) |
| MU indication | 1 | Indicate whether a PPDU is an SU-MIMO PPDU or MU-MIMO PPDU |
| GI indication | 1 | Indicate whether a short GI or a long GI is used |
| Allocation information | 12 | Indicate a band or channel (or a subchannel index or a subband index) allocated to each STA in a band in which a PPDU is transmitted |
| Transmission power | 12 | Indicate transmission power for each channel or each STA |

The information included in each of the fields illustrated in Table 4 may comply with the definition of the IEEE 802.11 system. Furthermore, the aforementioned fields correspond to an example of fields which may be included in a PPDU, but the present invention is not limited thereto. That is, the fields may be substituted with different fields or may further include an additional field. All of the fields may not be essentially included. Another embodiment of information included in the HE-SIG A field is described later with reference to FIG. 6.

The HE-STF is used to improve AGC estimation performance in MIMO transmission.

The HE-SIG B field may include user-specific information that is required for each STA to receive its own data (e.g., a PSDU). The HE-SIG B field may be transmitted in one or two OFDM symbols. For example, the HE-SIG B field may include information about the modulation and coding scheme (MCS) of a corresponding PSDU and the length of the corresponding PSDU.

The L-STF, L-LTF, L-SIG field, and HE-SIG A field may be repeated in a 20 MHz channel unit and transmitted. For example, when a PPDU is transmitted through four 20 MHz channels (i.e., a 80 MHz band), the L-STF, L-LTF, L-SIG field, and HE-SIG A field may be repeated every 20 MHz channel and transmitted.

If an FFT size is increased, a legacy STA supporting the existing IEEE 802.11a/g/n/ac systems may not decode a corresponding HE PPDU. In order for a legacy STA and an HE STA to coexist, the L-STF, L-LTF, and L-SIG field are transmitted through 64 FFT in a 20 MHz channel so that the legacy STA may receive a corresponding HE PPDU. For example, the L-SIG field may occupy a single OFDM symbol, the single OFDM symbol time may be 4 µs, and a GI may be 0.8 µs.

An FFT size for each frequency unit may be further increased from the HE-STF (or the HE-SIG A field). For example, 256 FFT may be used in a 20 MHz channel, 512 FFT may be used in a 40 MHz channel, and 1024 FFT may be used in an 80 MHz channel. If the FFT size increases, the number of OFDM subcarriers per unit frequency increases because spacing between OFDM subcarriers is reduced, but an OFDM symbol time increases. In order to improve system efficiency, the length of a GI after the HE-STF may be configured to be the same as the length of the GI of the HE-SIG A field.

The HE-SIG A field may include information that is required for an HE STA to decode a corresponding HE PPDU. However, the HE-SIG A field may be transmitted through 64 FFT in a 20 MHz channel so that both a legacy STA and an HE STA may receive a corresponding HE PPDU. The reason for this is that the HE STA has to receive an existing HT/VHT format PPDU in addition to the HE format PPDU and the legacy STA and the HE STA have to distinguish the HT/VHT format PPDU from the HE format PPDU.

FIG. 6 is a diagram illustrating an HE format PPDU according to an embodiment of the present invention.

FIG. 6 shows an example in which 20 MHz channels are allocated to different STAs (e.g., an STA 1, an STA 2, an STA 3, and an STA 4).

Referring to FIG. 6, an FFT size per unit frequency may further increase from an HE-STF (or an HE-SIG B field). For example, from the HE-STF (or the HE-SIG B field), 256 FFT may be used in a 20 MHz channel, 512 FFT may be used in a 40 MHz channel, and 1024 FFT may be used in an 80 MHz channel.

Information transmitted in each field included in a PPDU is the same as that of FIG. 26, and a description thereof is omitted.

The HE-SIG B field may include information specific to each STA, but may be encoded over the entire band (i.e., indicated in an HE-SIG A field). That is, the HE-SIG B field includes information about all of STAs, and is received by all of the STAs.

The HE-SIG B field may provide notification of information about a frequency bandwidth allocated to each STA and/or stream information in a corresponding frequency band. For example, in FIG. 6, in the HE-SIG B field, 20 MHz may be allocated to the STA 1, subsequent 20 MHz may be allocated to the STA 2, subsequent 20 MHz may be allocated to the STA 3, and subsequent 20 MHz may be allocated to the STA 4. In an embodiment, 40 MHz may be allocated to the STA 1 and the STA 2, and 40 MHz may be allocated to the STA 3 and the STA 4. In this case, different streams may be allocated to the STA 1 and the STA 2, and different streams may be allocated to the STA 3 and the STA 4.

Furthermore, an HE-SIG-C field may be defined and added to the example of FIG. 6. In this case, information about all of STAs may be transmitted over the entire band in the HE-SIG B field, and control information specific to each STA may be transmitted in a 20 MHz unit through the RE-SIG-C field.

Furthermore, unlike in the examples of FIGS. 5 and 6, the HE-SIG B field is not transmitted over the entire band, but may be transmitted in a 20 MHz unit like the HE-SIG A field. This is described below with reference to FIG. 7.

FIG. 7 is a diagram illustrating an HE format PPDU according to an embodiment of the present invention.

FIG. 7 shows an example in which 20 MHz channels are allocated to different STAs (e.g., an STA 1, an STA 2, an STA 3, and an STA 4).

Referring to FIG. 7, an HE-SIG B field is not transmitted over the entire band, but is transmitted in a 20 MHz unit like an HE-SIG A field. In this case, the HE-SIG B field is encoded in a 20 MHz unit unlike the HE-SIG A field, but may be duplicated in a 20 MHz unit and may not be transmitted.

In this case, an FFT size per unit frequency may further increase from an HE-STF (or the HE-SIG B field). For example, from the HE-STF (or the HE-SIG B field), 256 FFT may be used in a 20 MHz channel, 512 FFT may be used in a 40 MHz channel, and 1024 FFT may be used in an 80 MHz channel.

Information transmitted in each field included in a corresponding PPDU is the same as that of FIG. 26, and a description thereof is omitted.

The HE-SIG A field is duplicated in a 20 MHz unit and transmitted.

The HE-SIG B field may provide notification of information about a frequency bandwidth allocated to each STA and/or stream information in a corresponding frequency band. Since the HE-SIG B field includes information about each STA, it may include information about each STA in a 20 MHz unit. In this case, FIG. 7 shows an example in which 20 MHz is allocated to each STA. For example, if 40 MHz is allocated to each STA, the HE-SIG B field may be duplicated in a 20 MHz unit and transmitted.

In a situation in which a different bandwidth is supported for each BSS, if some bandwidth having a low interference level from a neighboring BSS is allocated to an STA, it may be preferred that the HE-SIG B field is not transmitted over the entire band as described above.

For example, the HE format PPDU of FIG. 7 is described below, for convenience of description.

In FIGS. 5 to 7, a data field is payload and may include a service field, a scrambled PSDU, tail bits, and padding bits.

HE format PPDUs, such as those of FIGS. 5 to 7, may be identified based on a repeated L-SIG (RL-SIG) field, that is, a repetition symbol of the L-SIG field. The RL-SIG field is inserted prior to the HE SIG-A field, and each STA may determine the format of a received PPDU to be an HE format PPDU using the RL-SIG field.

A method in which an AP operating in a WLAN system transmits data to a plurality of STAs on the same time resource may be called downlink multi-user (DL MU)

transmission. In contrast, a method in which a plurality of STAs operating in a WLAN system transmits data to an AP on the same time resource may be called uplink multi-user (UL MU) transmission.

Hereinafter, DL MU transmission or UL MU transmission may be multiplexed on a frequency domain or a spatial domain.

If DL MU transmission or UL MU transmission is multiplexed on the frequency domain, different frequency resources (e.g., subcarriers or tones) may be allocated to a plurality of STAs as DL or UL resources based on orthogonal frequency division multiplexing (OFDMA). Such a transmission method through different frequency resources on the same time resource may be referred to as "DL/UL MU OFDMA transmission."

If DL MU transmission or UL MU transmission is multiplexed on the spatial domain, different spatial streams may be allocated to a plurality of STAs as DL or UL resources. Such a transmission method through different spatial streams on the same time resources may be referred to as "DL/UL MU MIMO transmission."

The current WLAN system does not support UL MU transmission due to the following constraints.

In the current WLAN system, synchronization for transmission timing of UL data transmitted by a plurality of STAs is not supported. For example, assuming that a plurality of STAs transmits UL data through the same time resource in the existing WLAN system, in the current WLAN system, each of the plurality of STAs is unaware of transmission timing of the UL data of a different STA. Accordingly, it is difficult for an AP to receive the UL data on the same time resource from each of the plurality of STAs.

Furthermore, in the current WLAN system, frequency resources that are used for a plurality of STAs to transmit UL data may overlap. For example, if a plurality of STAs has different oscillators, a frequency offset may be generated. If a plurality of STAs having different frequency offsets performs UL transmission through different frequency resources at the same time, some of frequency regions used by the plurality of STAs may overlap.

Furthermore, in the existing WLAN system, power control is not performed on each of a plurality of STAs. An AP may receive a signal having different power from each of a plurality of STAs depending on the distance and a channel environment between the AP and each of the plurality of STAs. In this case, a signal reached with weak power may not be detected by the AP compared to a signal reached with strong power.

Method for Performing CCA

A clear channel assessment (CCA) method of an HE STA is described below in more detail. As described above, an AP STA and a non-AP STA perform CCA in order to determine the busy/idle state of a channel. CCA indicates a logical function/operation in the physical layer in which the current use state of a wireless medium (WM) is determined.

An STA performs CCA in the physical layer and reports a result of the execution of CCA to the MAC layer. The STA may perform CCA in two modes, that is, CCA-energy detection (ED) and CCA-carrier sensing (CS). In an embodiment, the STA may determine the busy/idle state of a channel by performing CCA-ED, performing CCA-CS, or using a combination of CCA-CS and CCA-ED. If CCA-CS and CCA-ED are combined, the STA may perform CCA by first performing CCA-CS and then performing CCA-ED or may perform CCA by first performing CCA-ED and then performing CCA-CS.

CCA-CS is performed through signal detection for a preamble. The threshold of CCA-CS is determined based on a minimum modulation and code rate sensitivity. Furthermore, a level of CCA-CS, that is, a threshold value, may be set as a different value depending on a bandwidth. For example, in the case of 20 MHz channel spacing, an STA may determine a channel to be busy if the size of a received/obtained preamble signal (or CCA value) is −82 dBm or more. In the case of 10 MHz channel spacing, an STA may determine a channel to be busy if the size of a received/obtained preamble signal (or CCA value) is −85 dBm or more. In the case of 5 MHz channel spacing, an STA may determine a channel to be busy if the size of a received/obtained preamble signal (or CCA value) is −88 dBm or more. On the contrary, an STA may determine the channel to be idle if the size of the received/obtained preamble signal (or CCA value) is less than the threshold (dBm)(e.g. −82 dBm, −85 dBm, −88 dBm). In an embodiment, an STA may perform CCA-CS using the correlation of STFs in the preamble of an 802.11a signal. In this specification, a CCA threshold/threshold value of an dBm unit may be called a CCA level. In this specification, CCA-CS may also be called CCA-signal detection (SD).

In the case of CCA-ED, an STA may determine a channel to be busy if a specific signal is detected with intensity (dBm) of a threshold value or more regardless of a signal defined in the 802.11 system. In this case, the threshold may be calculated as a value that is 20 dBm higher than that of CCA-CS. For example, an STA may determine a channel to be busy if a threshold is −62 dBm or more in the case of 20 MHz channel spacing. An STA may determine a channel to be busy if a threshold is −65 dBm or more in the case of 10 MHz channel spacing. An STA may determine a channel to be busy if a threshold is −68 dBm or more in the case of 5 MHz channel spacing.

A method described hereinafter may be applied to both CCA-CS and CCA-ED, but in the following embodiments, an example in which an STA performs CCA-CS is described.

If an STA and a system support a broadband, such as 20/40/80/160 MHz, a different CCA level may be applied to a primary channel and a non-primary channel (or a secondary channel). In this case, CCA levels (or threshold values) according to respective channel bandwidths may be defined as in Table 5.

TABLE 5

| Channel bandwidth | Signal threshold (primary) | Signal threshold (non-primary) | Energy threshold (non-primary) |
| --- | --- | --- | --- |
| 20 Hz | −82 dBm | −72 dBm | −62 dBm |
| 40 MHz | −79 dBm | −72 dBm | −59 dBm |
| 80 MHz | −76 dBm | −69 dBm | −86 dBm |
| 160 MHz | −73 dBm | n/a | n/a |

In Table 5, in the case of a 160 MHz channel, a corresponding signal threshold/energy threshold is not defined because a secondary channel is not present.

Figure 8:
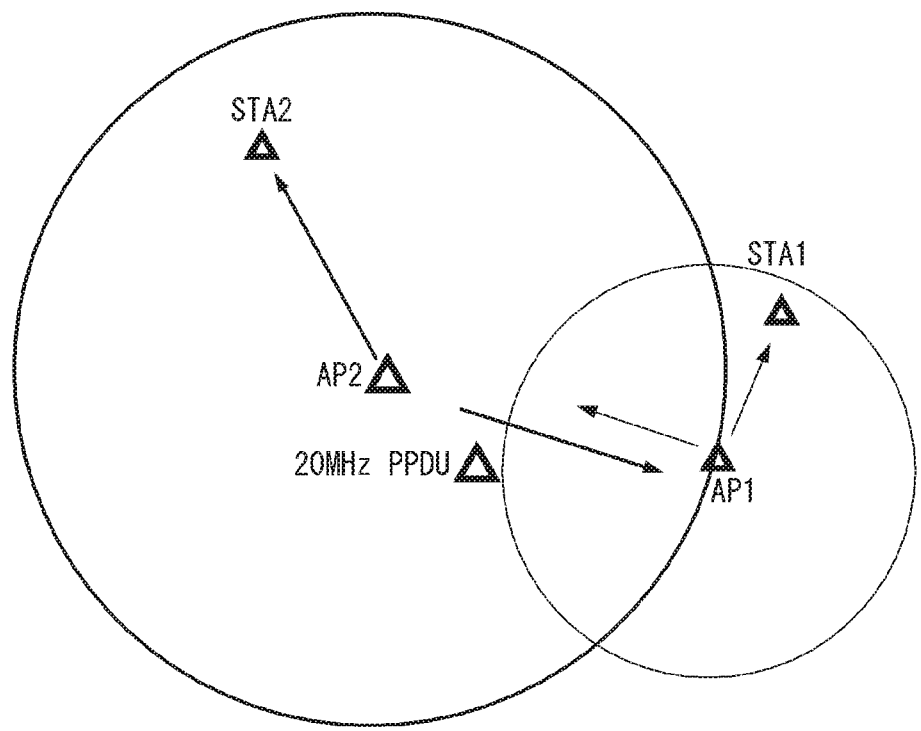
FIG. 8 is a conceptual diagram showing a method for performing CCA according to an embodiment of the present invention.

FIG. 8 is a conceptual diagram showing a method for performing CCA according to an embodiment of the present invention.

As described above, an efficient resource operation on the space may be difficult because a CCA level, that is, a CCA threshold, is managed as a fixed value within a single BSS for each channel bandwidth. In FIG. 8 and the following embodiments, an AP 1 and an STA 1 may belong to a first BSS, and an AP 2 and an STA 2 may belong to a second BSS.

Referring to FIG. 8, the AP 2 may send a PPDU to the STA 2 through a 20 MHz channel. In this case, when a signal transmitted by the AP 2 is received by the AP 1 with signal intensity of −82 dBm or more, the AP 1 determines the channel to be busy and does not send a signal to the STA 1. However, in an environment in which the AP 1 and the STA 1 are sufficiently distant from the AP 2 or the STA 2 or interference from the signal transmitted by the AP 1 does not have a great influence on the STA 2, it is more efficient that the AP 1 sends the signal to the STA 1. That is, if a fixed CCA level is used, resource use efficiency on the space is deteriorated. More specifically, this may be problematic if the first BSS to which the AP 1 and the STA 1 belong and the second BSS to which the AP 2 and the STA 2 belong are overlapping basic service sets (OBSS) as shown in FIG. 8. In this case, the OBSS refers to BSSs in which some or all of the BSAs of different BSSs partially overlap and operate on the same channel. Furthermore, an AP/STA placed in a BSA overlapped between two BSSs is called an OBSS AP/STA.

Accordingly, an STA may perform spatial reuse (SR) (improvement on spatial efficiency) in which spatial resources are efficiently used by dynamically adjusting a CCA level according to a situation, determining the busy or idle state of a channel based on the adjusted CCA level, and transmitting a signal. That is, the STA does not apply a uniform CCA level, but may adjust a CCA level low (or by reducing a criterion for determining the idle state of a channel) if the STA determines that it is not greatly influenced by interference attributable to a signal transmitted by an STA (i.e., an OBSS STA) belonging to an OBSS, thereby being capable of using transmission resources more efficiently.

In this case, in order for the STA to perform SR according to a situation (or in order to dynamically adjust a CCA level according to a situation), a criterion for calculating and adjusting a CCA level and a rule by which a CCA level is managed need to be previously defined. Accordingly, this specification proposes an efficient method for supporting the SR technology of an STA. More specifically, this specification proposes an efficient method for supporting the execution of the SR of an STA belonging to an OBSS in an UL OFDMA environment.

In this specification, dynamic CCA means that a CCA level is adjusted according to a specific criterion instead of using a fixed CCA level and CCA is performed based on the adjusted CCA level. In the following embodiments, a change of a CCA level may be applied to STAs belonging to an OBSS. Accordingly, spatial reuse efficiency of a bandwidth between STAs belonging to an OBSS can be improved.

Method for Supporting Spatial Reuse (SR) Technology

This specification proposes a method for supporting the execution of the SR of an OBSS AP/STA by sending SR support information for supporting the execution (or operation) of the efficient spatial reuse (SR) of STAs (more specifically, OBSS STAs).

The SR support information may include various pieces of control information which are used for an OBSS AP/STA to perform SR. For example, the SR support information may include various pieces of information for supporting the SR of an OBSS AP/STA, such as a sensitivity for the interference of a victim STA (e.g., corresponding to the receiver of on-going transmission, or an AP in the case of an UL transmission procedure, or a STA in the case of DL transmission procedure), and/or an interference size or characteristic that it experiences, and/or a margin value at which interference may be tolerated (or the amount of interference permissible for the current MCS level) (or an acceptable interference level), and/or whether surrounding OBSS STAs will perform SR or not (i.e., whether the execution of the SR of OBSS STAs will be permitted), and/or a value at which OBSS STAs may change or adjust a CCA level (i.e., CCA level adjustment information), and/or a CCA level and/or a TX power value (e.g., information regarding that a victim STA sends a signal with power of what dB). Such SR support information may also be called a "(first/second) SR support parameter value."

The SR support information may be transmitted to OBSS AP/STAs through the HE-SIG A field. The reason why the SR support information is transmitted through the HE-SIG A field other than the HE-SIG B field is that the HE-SIG B field includes common or individual information for an intended user (or a specific/target STA) and thus OBSS AP/STAs are unable to be forced to decode the HE-SIG B field. However, the SR support information may be included in the HE-SIG A field and transmitted because each of all of OBSS AP/STAs needs to decode the HE-SIG A field in order to determine whether a frame received by each OBSS AP/STA is a myBSS frame or not (i.e., whether a received frame is a frame transmitted by an AP/STA belonging to the same BSS as each OBSS AP/STA).

Accordingly, in this specification, it is assumed that in the newly proposed SR support method, the AP/STA of a specific BSS obtains the SR support information from the AP/STA of an OBSS (or the AP/STA of another BSS) through a received HE-SIG A field and performs SR for a PPDU length or TXOP duration indicated by the HE-SIG A field using the obtained SR support information.

In the 802.11ax system into which the OFDMA technology has been introduced, an AP sends a trigger frame in order to trigger UL MU OFDMA transmission. In this case, the transmitted trigger frame includes various pieces of configuration information (or trigger information) about an UL MU PPDU (or an UL MU frame) to be transmitted by each STA.

A DL PPDU including a trigger frame is transmitted using only the HE-SIG A field of a PHY header. Accordingly, an AP may use MAC payload (or a MAC frame body) within a PSDU in order to send individual configuration/trigger information (i.e., user-specific configuration information) about each STA. Furthermore, if each of STAs that have received a trigger frame sends an UL PPDU (or an HE trigger-based PPDU), it needs to send an UL PPDU on which the same (or common) HE-SIG A field has been loaded (because a method for generating the HE-SIG A field is indicated by the same trigger frame).

When such points are taken into consideration, the following problems may occur if the SR support information is transmitted to an OBSS AP/STA through the HE-SIG A field.

In an UL OFDMA transmission situation, efficient spatial reuse is possible only when SR support information transmitted by STAs is individually set by taking into consideration quality of a link between each STA and an AP. However, the SR support information is identically transmitted by STAs because the HE-SIG A field carrying the SR support information is identically transmitted by each STA. Accordingly, there is ambiguity regarding how the SR support information identically transmitted by STAs will be configured (or set).

Accordingly, this specification proposes a method regarding how the SR support information identically transmitted by STAs through the HE-SIG A field in common will be signaled in an UL OFDMA environment. More specifically, in an UL OFDMA environment, a victim STA is an AP. Accordingly, an AP, that is, a victim STA, sends SR indication information which is used to generate the SR support information to be transmitted to an OBSS AP/STA through the trigger frame so that the execution of the SR of the OBSS AP/STA can be supported more efficiently.

In this specification, the SR indication information is indication/control information used to generate the SR support information. The SR support information may be generated based on the SR indication information. The SR support information and the SR indication information may be configured at least partially identically or at least partially differently depending on circumstances. For example, the SR indication information may include only the SR support information or may include other indication control information for generating the SR support information along with the SR support information. If the SR indication information is configured identically with the SR support information, the SR support information may be generated by duplicating the SR indication information without any change.

Figure 9:
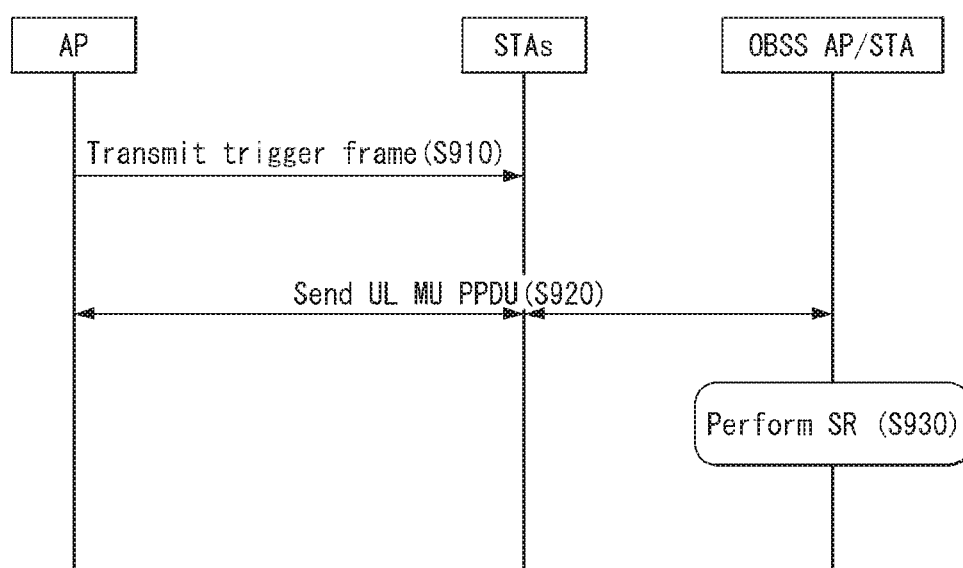
FIG. 9 is a flowchart illustrating a method for transmitting, by an STA apparatus, an UM MU PPDU according to an embodiment of the present invention.
Figure 10:
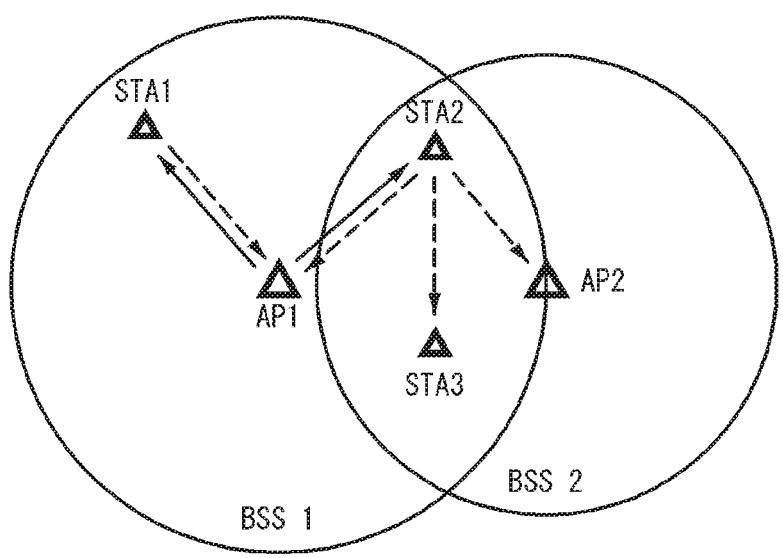
FIG. 10 is a conceptual diagram showing a method for performing SR according to an embodiment of the present invention.

FIG. 9 is a flowchart illustrating a method for transmitting, by an STA apparatus, an UM MU PPDU according to an embodiment of the present invention. FIG. 10 is a conceptual diagram showing a method for performing SR according to an embodiment of the present invention. In FIGS. 9 and 10, an AP (AP 1) and STA (STA 1 and/or 2) denote an AP and STA associated with the same first BSS (BSS 1). An OBSS AP (AP 2) and/or STA (STA 3) denote an AP and/or STA which are associated with a second BSS (BSS 2) having a BSA overlapping the first BSS (BSS 1) and are placed in the overlapped BSA.

Referring to FIGS. 9 and 10, first, the AP (AP 1) may transmit a trigger frame that requests UL MU transmission to a plurality of STAs (STA 1 and 2) (S910). In this case, the trigger frame may include trigger information (or configuration information) for supporting the UL MU transmission of a STA and SR indication information (or one or more first SR support parameter values) for indicating the SR of OBSS AP/STA (AP 2/STA 3) and generating SR support information (or one or more second SR support parameter values). The SR indication information is transmitted in a MAC payload of the trigger frame and is applied for the each of the plurality of STAs in common.

As described above, in an UL OFMDA environment, a victim STA is an AP (AP 1). Accordingly, it is most efficient that the AP (AP 1), that is, a victim STA, directly generates SR permission information about the OBSS STA (AP 2/STA 3), clear channel assessment (CCA) level adjustment information about the OBSS STA (AP 2/STA 3), transmission power information about the AP (AP 1), and interference level information acceptable to the AP and provides them to the OBSS AP/STA (AP 2/STA 3). Accordingly, the AP (AP 1) generates SR indication information for generating SR support information to be provided to the OBSS AP/STA (AP 2/STA 3) by taking into consideration the current channel situation and/or the current interference situation, etc., includes the SR indication information in a trigger frame, and sends the trigger frame to a plurality of STAs (STA 1 and 2) through DL. In this case, the SR indication information may be control information identically transmitted to the plurality of STAs (STA 1 and 2) so that the plurality of STAs (STA 1 and 2) may generate the same SR support information. The AP (AP 1) may generate an SR indication field (e.g., an HE-SIG A info field) including the SR indication information, may include the SR indication field in the trigger frame, and may send the trigger frame to the STAs (STA 1 and 2) through DL.

Next, each of the plurality of STAs (STA 1 and 2) may send an UL MU PPDU (e.g., an HE trigger-based PPDU, an UL MU frame), generated based on the received trigger frame, to the AP (AP 1) (S920). More specifically, each of the plurality of STAs (STA 1 and 2) that has received the trigger frame may generate the UL MU PPDU, including a physical (PHY) preamble and a data field, based on trigger information included in the trigger frame. More specifically, the STA (STA 1 and/or 2) may generate SR support information (e.g., in a SR support subfield) included in a HE-SIG A field of the PHY preamble of the UL MU PPDU based on the SR indication information received through trigger frame. In other words, the HE-SIG A field in the UL MU PPDU (or UL MU frame) includes SR support information and the SR support information is set by using the SR indication information.

For example, the STA (STA 1 and/or 2) may generate the SR support information by duplicating the received SR indication information without change or generate the SR support information by processing the SR indication information according to an UL PPDU transmission format and, may generate the HE-SIG A field including the corresponding SR support information. That is, while the SR support information is generally characterized as being generated based on the SR indication information, the SR support information may be generated so that it is at least partially or even fully identical with the SR indication information or at least partially different from the SR indication information. In the case of at least partial identity between the SR indication information and the SR support information, at least one SR support parameter value is identically contained in both types of information. The STA may send the UL MU PPDU into which the generated HE-SIG A field has been inserted to the AP.

In this case, the OBSS AP/STA (AP 2/STA 3) may overhear (or receive) the UL MU PPDU transmitted by the STA (STA 2). In this case, the OBSS AP/STA (AP 2/STA 3) may denote an AP/STA (AP 2/STA 3) belonging to an OBSS with respect to a BSS (BSS 1) to which the AP (AP 1) and STA (STA 1 and 2) sending the trigger frame belong. Furthermore, in this case, overhearing the UL MU PPDU means that an UL MU PPDU transmitted by an STA (STA 2) belonging to a BSS (BSS 1) different from a BSS (BSS 2) to which (or with which) the OBSS AP/STA (AP 2/STA 3) belongs (are associated) is received.

As described above, the OBSS AP/STA (AP 2/STA 3) may decode the HE-SIG A field in order to check whether the received UL MU PPDU is the frame of a BSS to which the OBSS AP/STA (AP 2/STA 3) belongs (checks a BSS color field). As a result, the OBSS AP/STA (AP 2/STA 3) overhears the HE-SIG A field of the UL MU PPDU. As a result, the OBSS AP/STA (AP 2/STA 3) may obtain the SR support information included in the HE-SIG A field.

That is, in conclusion, the STA (STA 2) may function to transfer the SR indication information, received from the AP (AP 1), to the OBSS AP/STA (AP 2/STA 3) as the SR support information. Furthermore, as described above, since the HE-SIG A field is identically transmitted to the STAs (STA 1 and 2) that have received the trigger frame, all of the OBSS AP/STAs (AP 2/STA 3) overhearing the UL MU PPDU transmitted based on the trigger frame receive the same SR support information from the STAs (STA 1 and 2).

Furthermore, although not shown in the flowchart of FIG. 9, the OBSS AP/STA (AP 2/STA 3) may overhear an UL SU PPDU, transmitted by an STA associated with a different BSS, in addition to the UL MU PPDU. In this case, the HE-SIG A field of the UL SU PPDU may also include SR support information as in the aforementioned embodiment. The OBSS AP/STA (AP 2/STA 3) may perform SR based on the SR support information obtained by decoding the HE-SIG A field.

Next, the OBSS AP/STA (AP 2/STA 3) may perform SR (S930). More specifically, the OBSS AP/STA (AP 2/STA 3) may perform SR based on the SR support information of the HE-SIG A field included in the overheard (or received) UL MU PPDU. For example, the OBSS AP/STA (AP 2/STA 3) may adjust a CCA level, that is, a criterion for determining the busy or idle state of a channel, based on the overheard SR support information, may determine the state of the channel based on the adjusted CCA level, and may send a signal.

In accordance with the aforementioned flowchart, an AP (AP 1), that is, a victim STA, directly generates SR support information based on SR indication information generated by taking into consideration its own capabilities, a surrounding interference situation, a channel situation, etc. Accordingly, there is an advantage in that SR support information having the highest reliability is transmitted assuming that the same SR support information is transmitted to all of OBSS AP/STAs (AP 2/STA 3). Furthermore, if SR support information is generated identically with SR indication information, an STA (STA 1 and 2) may generate SR support information by duplicating the SR indication information received through a trigger frame without any change. Accordingly, there is an advantage in that a procedure for generating the SR support information becomes very simple.

The HE-SIG A field of an UL MU PPDU may be configured to include only SR support information. In this case, it may be said that "the HE-SIG A field of the UL MU PPDU is generated based on SR indication information." Furthermore, if SR support information is generated identically with SR indication information, it may be said that "the HE-SIG A field of an UL MU PPDU may be configured to include the SR indication information received through a trigger frame."

As described above, the SR indication information may be transmitted to STAs (STA 1 and 2) through the trigger frame. A detailed method for signaling such SR indication information within a trigger frame needs to be determined. Accordingly, a method for efficiently signaling the SR indication information is hereinafter proposed. Prior to a description of the method, the structure of the trigger frame is first described below.

FIG. 11 is a diagram showing the structure of the trigger frame according to an embodiment of the present invention.

Referring to FIG. 11, the trigger frame may include a Frame Control field, a Duration field, an RA field, a TA field, a Common Info field (or a common information field), a Per User (STA) Info N field (or a user-specific field and an STA Info N field), padding bits, and FCS. The present invention is not limited to such fields, and some of the fields included in the trigger frame may be excluded or a new field may be added to the trigger frame.

The RA field indicates the address of a reception STA (or the address of an intended user/STA) that receives the trigger frame. The RA field may be included in or excluded from the trigger frame depending on an embodiment.

The TA field indicates the address of an STA that sends the trigger frame.

The Common Info field indicates a field including common control information which is received in common by STAs that receive the trigger frame. The Common Info field may include trigger type information, UL PPDU length information, BW information, GI information, LTF type information, LTF Num (number) information and/or sounding dialog token information. In this case, the UL PPDU length information indicates a (maximum) length of an UL MU PPDU triggered by the trigger frame. The BW information indicates the transmission bandwidth of a corresponding UL MU PPDU. The GI information indicates a guard interval applied to a corresponding UL MU PPDU (or indicates a guard interval when a corresponding UL MU PPDU is generated). The LTF type information indicates the LTF type of a corresponding UL MU PPDU. The LTF Num information indicates the number of an HE-LTF included in a corresponding UL MU PPDU. The sounding dialog token information indicates a sounding dialog token number.

The Per User Info N field indicates a field including STA-specific control information that is individually received by each STA. Accordingly, the number of Per User Info N fields corresponding to the number of STAs may be included in the trigger frame. The Per User Info N field may include AID information of an STA that receives a corresponding field and MCS information, coding information, feedback type information, Nc index information, Nr index information, and codebook information which are used for an STA to generate/send an UL MU frame.

The structure of the trigger frame has been described above. A method for signaling the SR indication information is described below. This specification proposes i) a PHY signaling method, ii) an MAC signaling method, and iii) a hybrid signaling method, that is, methods for signaling the SR indication information.

1. PHY Signaling Method

In accordance with a first embodiment of the present invention, SR indication information may be signaled in the PHY preamble. That is, the SR indication information may be included in the PHY preamble of a DL MU PPDU that carries a trigger frame and may be transmitted to STAs. More specifically, the SR indication information may be included in the HE-SIG A field of the PHY preamble of the DL MU PPDU and transmitted.

SR support information transmitted from each STA to an OBSS AP/STA through the HE-SIG A field of an UL MU PPDU may be generated based on SR indication information which is transmitted through the HE-SIG A field of a DL MU PPDU including a trigger frame transmitted by an AP.

For example, SR support information transmitted from each STA to an OBSS AP/STA may be generated substantially identically with SR indication information transmitted from an AP to the corresponding STA. In this case, the SR support information transmitted by the STA in an HE-SIG A field through UL may be generated/configured by duplicating the SR indication information of the HE-SIG A field transmitted from the AP to the corresponding STA through DL. Accordingly, the SR indication information transmitted through the HE-SIG A field of a trigger frame and the SR support information transmitted through the HE-SIG A field of an UL frame transmitted after the trigger frame may be the same (or may be substantially the same), but the present invention is not limited thereto. For example, the SR support information may be configured differently from the SR indication information.

The SR indication information may be generated (or configured) by taking into consideration the worst case in which a link that belongs to links between an AP and STAs that will perform UL transmission and that has the worst link quality or is most sensitive to interference. Alternatively, the SR indication information may be configured by taking into consideration the mean case of a link that belongs to links between an AP and STAs that will perform UL transmission and that has average link quality or has a mean influence of interference.

2. MAC Signaling Method

In accordance with a second embodiment of the present invention, SR indication information may be signaled through the MAC frame (or MAC payload) of a DL MU PPDU. More specifically, the SR indication information may be signaled in an MAC frame (or MAC payload) corresponding to a trigger frame and may be transmitted to each STA. In this case, the SR indication information may be identically transmitted to a plurality of STAs so that the plurality of STAs can generate the same SR support information. To this end, the SR indication information may be included in the Common Info field of the trigger frame and transmitted so that it is received in common by the plurality of STAs which receive the trigger frame.

SR support information transmitted from STAs to an OBSS AP/STA through the HE-SIG A field of an UL MU PPDU (or an UL MU frame) may be generated based on SR indication information received by the corresponding STAs through a trigger frame.

For example, SR support information transmitted from STAs to an OBSS AP/STA may be generated substantially identically with SR indication information transmitted from an AP to the corresponding STAs. This may be said that SR support information transmitted by STAs in UL using an HE-SIG A field is generated and configured by duplicating SR indication information transmitted by the AP using a trigger frame in DL, but the present invention is not limited thereto. The SR support information may be configured differently from the SR indication information.

The SR indication information may be included in the SR indication field of a trigger frame, and the SR support information may be included in the SR support subfield of an HE-SIG A field. Accordingly, the SR support subfield (or an HE-SIG A/Spatial Reuse subfield) in which an UL MU PPDU (or an UL MU frame) is transmitted to an OBSS AP/STA may be set/configured based on content (or a value) indicated by an SR indication field (or n HE-SIG A Info/Spatial Reuse field) included in the trigger frame. In this case, the content (or value) indicated by the SR indication information field may correspond to the SR support information (or an SR support parameter value). If the SR support information is generated identically with the SR indication information, the content (or value) indicated by the SR indication information field ay correspond to the SR indication information.

The SR indication information may be transmitted as a single value so that it is applied to STAs in common. This may be said that a single piece of SR indication information is transmitted through a trigger frame. Alternatively, if the HE-SIG A field of an UL MU PPDU (or UL MU frame) transmitted by each STA is not duplicated (or is not identically transmitted) or SR support/indication information can individually operate for each STA, the SR indication information may be transmitted with a plurality of values so that each STA can configure/apply different SR indication information. In this case, the SR indication information may be included in the Per User Info N field of the trigger frame and transmitted to each STA.

If SR indication information is transmitted with a plurality of values as described above, the SR indication information and the SR support information of an UL MU PPDU to be subsequently transmitted by a plurality of STAs may have different values or SR support information transmitted by each of a plurality of STAs in UL may have a different value.

A single piece of SR indication information transmitted through a trigger frame may be generated (or configured) by taking into consideration the worst case in which a link that belongs to links between an AP and STAs that will perform UL transmission and that has the worst link quality or is most sensitive to interference. Alternatively, the corresponding SR indication information may be configured by taking into consideration the mean case of a link that belongs to links between an AP and STAs that will perform UL transmission and that has average link quality or has a mean influence of interference.

The second embodiment has an advantage in that it has smaller signaling overhead than the first embodiment. A trigger frame corresponds to a broadcast frame in common received (or decoded) by a plurality of STAs. Accordingly, if SR indication information is once inserted into the trigger frame, STAs which have received a DL MU PPDU carrying the trigger frame receive the same SR indication information at once.

In contrast, in accordance with the first embodiment, the SR indication information needs to be signaled in the HE-SIG A field. As described above, the same SR indication information is also duplicated and transmitted in a 20 MHz unit because the HE-SIG A field is identically duplicated and transmitted in a 20 MHz unit. Accordingly, in accordance with the second embodiment, there is a problem in that signaling overhead for the SR indication information is increased by the number of duplications of the HE-SIG A field. If a DL MU PPDU is transmitted through an 80 MHz channel, signaling overhead is increased that much because SR indication information is duplicated four times and transmitted.

Accordingly, the second embodiment has an advantage in that it has smaller signaling overhead for SR indication information than the first embodiment. Accordingly, if the bit size of a trigger frame is sufficient, the SR indication information may be signaled in the trigger frame. However, the present invention is not limited to such an example. For example, the SR indication information may be signaled in the HE-SIG A field if the bit size of the trigger frame is not sufficient or the bit size of the SR indication information is small.

3. Hybrid Signaling Method

In accordance with a third embodiment of the present invention, SR indication information may be signaled by a combination of the first and the second embodiments. That is, the SR indication information may be signaled in the PHY preamble and the MAC frame.

For example, if there is a difference between SR indication information and SR support information, the SR indication information (or a first SR support parameter value) may be signaled in the PHY preamble (e.g., the HE-SIG A field) according to the first embodiment. A difference between SR indication information (or a second SR support parameter value) and SR support information (or an SR support parameter) to be transmitted by each STA (i.e., a differential value between the first and the second SR support parameter values) may be signaled in a trigger frame.

Furthermore, if the HE-SIG A field of an UL MU PPDU (or an UL frame) transmitted by each STA is not duplicated (or identically transmitted) or SR indication information is capable of individual operation for each STA, a trigger frame may individually indicate a difference between the SR indication information and SR indication information to be transmitted by each STA in UL for each STA. In this case, the SR indication information may be included in the Per User Info N field of the trigger frame for each STA and transmitted.

As described above, the SR indication information may be signaled in various ways in accordance with the proposed first to third embodiments of the present invention or a combination of them, and may be transmitted from an AP, that is, a victim STA, to an OBSS AP/STA as SR support information. The OBSS AP/STA may determine whether or not to perform SR based on the SR support information received as described above and may efficiently use spatial resources.

In this specification, an embodiment in which SR support information is transmitted through an UL MU PPDU transmitted as a response to a DL MU PPDU including a trigger frame has been described, for convenience of description. However, the preset invention is not limited to the UL MU PPDU. The aforementioned descriptions may be identically applied to a PPDU including the HE-SIG A field regardless of a PPDU format. Accordingly, the HE-SIG A field of the PPDU may include SR support information, and an OBSS AP/STA that has received the HE-SIG A field of the corresponding PPDU may obtain the SR support information.

Figure 12:
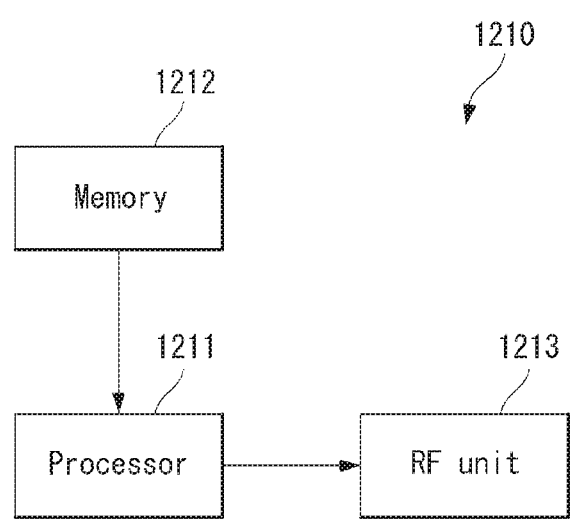
FIG. 12 is a block diagram of each STA apparatus according to an embodiment of the present invention.

FIG. 12 is a block diagram of each STA apparatus according to an embodiment of the present invention.

Referring to FIG. 12, the STA apparatus (or STA) 1210 may include memory 1212, a processor 1211, and a radio frequency (RF) unit 1213. Furthermore, as described above, the STA apparatus 1210 is an HE STA apparatus and may be an AP STA or a non-AP STA.

The RF unit 1213 is connected to the processor 1211 and may transmit/receive radio signals. The RF unit 1213 may up-convert data, received from the processor 1211, into a transmission/reception band, and may transmit a signal.

The processor 1211 is connected to the RF unit 1213 and may implement the physical layer and/or the MAC layer according to the IEEE 802.11 system. The processor 1211 may be configured to perform operations according to the various embodiments of the present invention based on the drawings and description. Furthermore, a module for implementing the operations of the STA 1210 according to the various embodiments of the present invention may be stored in the memory 1212 and may be executed by the processor 1111.

The memory 1212 is connected to the processor 1211 and stores various pieces of information for driving the processor 1211. The memory 1212 may be included in the processor 1211 or may be installed outside the processor 1211, and may be connected to the processor 1211 by the known means.

Furthermore, the STA apparatus 1210 may include a single antenna or multiple antennas.

A detailed configuration of the STA apparatus 1210 of FIG. 12 may be implemented so that the various embodiments of the present invention are independently applied to the configuration or two or more of the various embodiments are applied to the configuration at the same time. More specifically, the processor 1211 of the STA apparatus may be implemented to perform the aforementioned embodiments.

Furthermore, the terms described in the embodiments of the present invention may be substituted with other terms according to circumstances and are not limited to the aforementioned terms. Accordingly, although a different term is used, it may be considered as indicating the same object if it has the same function.

In the aforementioned embodiments, the elements and characteristics of the present invention have been combined in specific forms. Each of the elements or characteristics should be considered to be optional unless otherwise described explicitly. Each of the elements or characteristics may be implemented without being combined with other elements or characteristics. Furthermore, some of the elements and/or the characteristics may be combined to form an embodiment of the present invention. The sequence of the operations described in connection with the embodiments of the present invention may be changed. Some of elements or characteristics in an embodiment may be included in another embodiment or may be substituted with corresponding elements or characteristics in another embodiment. It is evident that in the claims, claims not having an explicit citation relation may be combined to form one or more embodiments or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Although the frame transmission method in a wireless communication system according to the embodiments of the present invention has been described based on an example in which the method is applied to the IEEE 802.11 system, it may also be applied to various other wireless communication systems in addition to the IEEE 802.11 system.

What is claimed is:
1. A method for indicating, by an access point (AP) associated with a first basic service set (BSS), spatial reuse (SR) in a wireless LAN (WLAN) system, the method comprising:
  transmitting a trigger frame which requests uplink multi-user (UL MU) transmission of a plurality of stations (STAs), wherein the trigger frame includes SR indication information used for the SR of an overlapping BSS (OBSS) STA; and receiving an UL MU physical protocol data unit (PPDU) generated based on the trigger frame from the plurality of STAs, wherein the UL MU PPDU is transmitted on at least one of 20 MHz, 40 MHz and 80 MHz channels, wherein the UL MU PPDU comprising sequentially a L(legacy)-preamble and a High Efficiency (HE)-preamble and a data field, wherein the HE-preamble includes sequentially a first high efficiency (HE)-signal (SIG) A field, an HE-Short Training Field (STF) field, and an HE-Long Training Field (LTF) field, wherein a first Inverse Discrete Fourier Transform (IDFT)/Discrete Fourier Transform (DFT) period is applied from the L-preamble to the first HE-SIG A field and a second IDFT/DFT period is applied from the HE-STF field to the data field, and wherein the second IDFT/DFT period is 4 times of the first IDFT/DFT period, wherein the first HE-SIG A field includes SR support information generated based on the SR indication information, and wherein the SR support information comprises SR permission information of the OBSS STA, transmission power information of the AP, and information about an interference level acceptable to the AP.

2. The method of claim 1, based on the AP being placed in an OBSS in which the first BSS and a second BSS overlap, further comprising:

receiving a second HE-SIG A field of a PPDU transmitted by an STA placed in the second BSS;

obtaining SR support information of the second HE-SIG A field; and performing the SR based on the SR support information of the second HE-SIG A field.

3. The method of claim 2, wherein the performing the SR comprises:

adjusting a clear channel assessment (CCA) level; and determining a busy or idle state of a channel based on the adjusted CCA level.

4. The method of claim 3, wherein the determining the busy or idle state of the channel based on the adjusted CCA level comprises:

obtaining a CCA value by performing CCA on the channel;

determining the busy state of the channel based on the CCA value being greater than the adjusted CCA level or the idle state of the channel based on the CCA value being less than the adjusted CCA level.

5. The method of claim 1, wherein:

the trigger frame comprises a Common Info field comprising common control information about a plurality of STAs receiving the trigger frame and a Per User Info field comprising STA-specific control information about each of the plurality of STAs, and the SR indication information is included in the Common Info field of the trigger frame.

6. The method of claim 2, wherein the SR is performed during a length of the PPDU.

7. An access point (AP) associated with a first basic service set (BSS) in a wireless LAN (WLAN) system, comprising:

a transceiver configured to transmit and receive radio signals; and a processor configured to control the transceiver to, transmit a trigger frame which requests uplink multi-user (UL MU) transmission of a plurality of stations (STAs), wherein the trigger frame includes SR indication information used for the SR of an overlapping BSS (OBSS) STA; and receive an UL MU physical protocol data unit (PPDU) generated based on the trigger frame from the plurality of STAs, wherein the UL MU PPDU is transmitted on at least one of 20 MHz, 40 MHz and 80 MHz channels, wherein the UL MU PPDU comprising sequentially a L(legacy)-preamble and a High Efficiency (HE)-preamble and a data field, wherein the HE-preamble includes sequentially a first high efficiency (HE)-signal (SIG) A field, an HE-Short Training Field (STF) field, and an HE-Long Training Field (LTF) field, wherein a first Inverse Discrete Fourier Transform (IDFT)/Discrete Fourier Transform (DFT) period is applied from the L-preamble to the first HE-SIG A field and a second IDFT/DFT period is applied from the HE-STF field to the data field, and wherein the second IDFT/DFT period is 4 times of the first IDFT/DFT period, wherein the first HE-SIG A field includes SR support information generated based on the SR indication information, and wherein the SR support information comprises SR permission information of the OBSS STA, transmission power information of the AP, and information about an interference level acceptable to the AP.

8. The AP of claim 7, based on the AP being placed in an OBSS in which the first BSS and a second BSS overlap, the STA is further configured to:

receive a second HE-SIG A field of a PPDU transmitted by an STA placed in the second BSS, obtain SR support information of the second HE-SIG A field, and perform the SR based on the SR support information of the second HE-SIG A field.

9. The AP of claim 8, wherein the STA is further configured to:

adjust a clear channel assessment (CCA) level; and determine a busy or idle state of a channel based on the adjusted CCA level.

10. The AP of claim 9, wherein the determine the busy or idle state of the channel based on the adjusted CCA level comprises:

obtain a CCA value by performing CCA on the channel;

determine the busy state of the channel based on the CCA value being greater than the adjusted CCA level or the idle state of the channel based on the CCA value being less than the adjusted CCA level.

11. The AP of claim 8, wherein:

the trigger frame comprises a Common Info field comprising common control information about a plurality of STAs receiving the trigger frame and a Per User Info field comprising STA-specific control information about each of the plurality of STAs, and the SR indication information is included in the Common Info field of the trigger frame.

12. The AP of claim 9, wherein the SR is performed during a length of the PPDU.

13. A method for indicating, by a station (STA) associated with a first basic service set (BSS), spatial reuse (SR) in a wireless LAN (WLAN) system, the method comprising:

receiving a trigger frame which requests uplink multi-user (UL MU) transmission of a plurality of stations (STAs), wherein the trigger frame includes SR indication information used for the SR of an overlapping BSS (OBSS) STA; and transmitting an UL MU physical protocol data unit (PPDU) generated based on the trigger frame from the plurality of STAs, wherein the UL MU PPDU is transmitted on at least one of 20 MHz, 40 MHz and 80 MHz channels, wherein the UL MU PPDU comprising sequentially a L(legacy)-preamble and a High Efficiency (HE)-preamble and a data field, wherein the HE-preamble includes sequentially a first high efficiency (HE)-signal (SIG) A field, an HE-Short Training Field (STF) field, and an HE-Long Training Field (LTF) field, wherein a first Inverse Discrete Fourier Transform (IDFT)/Discrete Fourier Transform (DFT) period is applied from the L-preamble to the first HE-SIG A field and a second IDFT/DFT period is applied from the HE-STF field to the data field, and wherein the second IDFT/DFT period is 4 times of the first IDFT/DFT period, wherein the first HE-SIG A field includes SR support information generated based on the SR indication information, wherein the SR support information comprises SR permission information of the OBSS STA, transmission power information of the AP, and information about an interference level acceptable to the AP.

14. The method of claim 13, based on the AP being placed in an OBSS in which the first BSS and a second BSS overlap, further comprising:

transmitting a second HE-SIG A field of a PPDU transmitted by an STA placed in the second BSS;

obtaining SR support information of the second HE-SIG A field; and performing the SR based on the SR support information of the second HE-SIG A field.

* * * * *